June 26, 1934.  H. W. KRAG  1,964,472
EDGE TRIMMER
Filed July 30, 1932
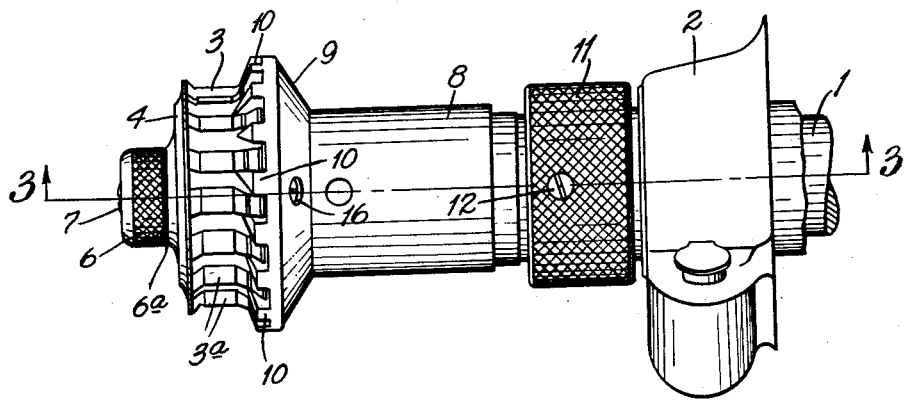
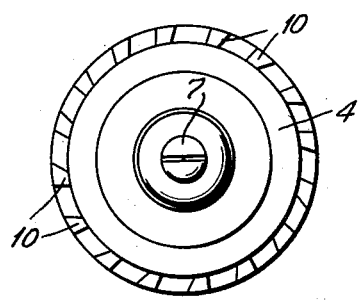
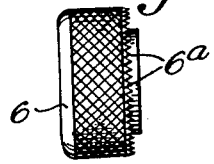
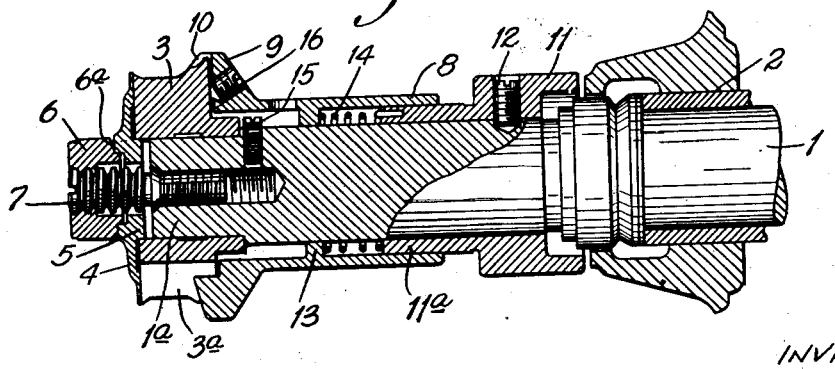
INVENTOR:
Harry W. Krag,
by Carr Kerr & Gravely,
HIS ATTORNEYS.

Patented June 26, 1934

1,964,472

UNITED STATES PATENT OFFICE 1,964,472

EDGE TRIMMER

Harry W. Krag, St. Louis, Mo., assignor to American Shoe Machinery and Tool Company, St. Louis, Mo., a corporation of Missouri Application July 30, 1932, Serial No. 627,161

5 Claims. (Cl. 12—91)

This invention relates to edge trimmers, particularly sole and heel edge trimmers of the type having rotary cutters that are provided with front and back guards and are capable of replacement when worn or when a cutter of a different character is desired. The invention has for its principal object to provide a simple and efficient arrangement that will permit the cutter to be quickly and easily attached to and removed from the rotary cutter shaft of the edge trimmer without the use of tools. Another object is to eliminate the necessity for adjusting the back guard for cutters of different widths. Other objects are increased strength and durability, cheapness of construction and compactness of design. The invention consists in the edge trimmer and in the arrangements and combinations of parts hereinafter described and claimed.

In the accompanying drawing, which forms part of this specification and wherein like symbols refer to like parts wherever they occur, Fig. 1 is a front elevation of a sole and heel edge trimmer embodying my invention, Fig. 2 is an end view thereof;

Fig. 3 is a central longitudinal section on the line 2—2 in Fig. 1; and

Fig. 4 is a side elevation of the clamping nut.

Referring to the accompanying drawing, my invention is shown in connection with an edge trimmer of the kind used by shoe repair men for trimming the edges of the soles and heels of shoes. Said edge trimmer comprises a horizontally disposed cutter shaft 1 that is journaled in a suitable bearing 2 and is driven in any desired manner (not shown). The cutter shaft 1 projects outwardly beyond the supporting bearing 2 therefor and has an outer end portion 1a of reduced diameter adapted to receive and support a circular cutter 3 having the usual cutter teeth 3a cut in its periphery. The cutter is clamped between the shoulder, which is formed by the reduced outer end portion 1a of the cutter shaft 1, and a shield or front guard 4 that bears against the outer end of said cutter and has a central pilot portion 5 adapted to fit within the outer end of the bore in said cutter and center the shield thereon. The shield, which covers the outer ends of the cutter teeth, is pressed against the outer end of the cutter by means of a knurled nut 6 threaded on the threaded outer end portion of a stud 7 that is screwed tightly into the outer end of said shaft and projects axially therefrom through a central opening in said shield. The threads on the stud 7 are comparatively coarse, while the threaded engagement between the nut and the stud is comparatively short, thereby permitting said nut to be quickly removed from said stud. The inner or shield engaging end of the nut 6 is provided with a multiplicity of fine teeth 6a that bear against said shield and thus serve to lock the nut and shield together.

Mounted on the cutter shaft 1 for independent rotary and longitudinal sliding movement thereon between the cutter 3 and the shaft bearing 2 is a cylindrical sleeve 8 having an enlarged outer end portion 9 which constitutes a back guard for said cutter. The outer face of the enlarged cutter guard portion 9 of the sleeve 8 is provided with a series of radially extending teeth 10 adapted to fit between the teeth 3a of the cutter 3 and thus force said cutter guard to rotate with said cutter. The inward sliding movement of the back guard is limited by means of a knurled collar 11 that is rigidly secured to the cutter shaft by means of a set screw 12. This set collar 11 is provided within an elongated hub portion 11a that fits within the inner end of the sleeve portion 8 of the back guard 9. The bore of the sleeve portion 8 of the back guard 9 is provided with an inwardly extending flange 13; and a coil spring 14 surrounds the cutter shaft between said flange and the adjacent outer end of the elongated hub portion 11a of the set collar 11 and serves to force said back guard outwardly towards the cutter. Inward sliding movement of the back guard 9 is limited by the set collar 11; and the outward sliding movement of said back guard is limited by a stop screw 15, which is threaded into the cutter shaft adjacent to the inner end of the cutter. A screw 16 is threaded through the back guard 9 with its inner end abutting against the inner end face of the cutter and serves to properly locate the outer face of the back guard with relation to inner corners of the cutter teeth.

By the arrangement described, when it is desired to change the cutter the operator grasps the knurled set collar 11 to hold the cutter shaft 1 from rotating, and the cutter shield 4 and back guard 9 are then rotated in a direction that will loosen the knurled nut 6 on the stud 7. The nut and the shield and cutter may then be withdrawn endwise from the cutter shaft. When the cutter is removed, the back guard is forced outwardly by the spring 14, but is prevented from being forced off the cutter shaft by the stop screw 15. In replacing a cutter, the cutter is slipped on the reduced end of the cutter shaft with its teeth 3a in engagement with the teeth 10 of the back guard 9. The shield 4 is slipped over the threaded outer end of the stud 7 and the nut 6 is tightened with the fingers to clamp the cutter slightly between said shield and the shoulder on the cutter shaft, the teeth 6a on the inner face of said nut serving to prevent the same from becoming loose. The screw 16 is then adjusted to properly locate the spring-pressed back guard with relation to the rear corners of the cutter teeth. While the rotary action of the cutter would tend to tighten the nut on the stud, said nut is tightened preferably by holding the cutter shaft from turning by means of the set collar and then rotating the shield, cutter and back guard in locking direction. As the back guard is of considerably larger diameter than the nut it is also more convenient to release said nut by rotating said back guard instead of manipulating the nut itself.

Obviously, the hereinbefore described edge cutter admits of considerable modification without departing from the invention. Therefore, I do not wish to be limited to the precise details of construction shown and described.

What I claim is:

1. An edge trimmer comprising a cutter shaft having an abutment thereon, a cutter sleeved on said shaft and engaging said abutment, a shield positioned against the outer end of said cutter, a threaded stud extending axially from said cutter shaft beyond the outer face of said shield, and a nut threaded on said threaded stud for holding the cutter shield against the outer face of said cutter and said cutter against the abutment on said shaft, the shield engaging portion of said nut being provided with teeth, whereby said nut is adapted to be tightened and released by rotating said shield relative to said shaft.

2. An edge trimmer comprising a cutter shaft having a reduced outer end portion forming a shoulder on said shaft, a cutter sleeved on the reduced outer end portion of said cutter shaft, a shield on said cutter shaft on the outer face of the cutter, a nut on said cutter shaft for clamping said cutter between said shield and the shoulder on said cutter shaft, and a back guard for said cutter slidably and freely rotatably mounted on said cutter shaft and having teeth on its cutter opposing face adapted to interlock with the teeth of said cutter, whereby said nut is adapted to be tightened and released by rotating said back guard relative to said cutter shaft.

3. An edge trimmer comprising a cutter shaft having a reduced outer end portion forming a shoulder on said shaft, a cutter sleeved on the reduced outer end portion of said cutter shaft, a shield on said cutter shaft on the outer face of the cutter, a nut on said cutter shaft for clamping said cutter between said shield and the shoulder on said cutter shaft, a back guard for said cutter slidably and freely rotatably mounted on said cutter shaft and having teeth on its cutter opposing face adapted to interlock with the teeth of said cutter, whereby said nut is adapted to be tightened and released by rotating said back guard on said cutter shaft, means for yieldably holding said back guard in engagement with said cutter, and means for limiting the inward sliding movement of said back guard on said cutter shaft, said limiting means constituting means for holding said cutter shaft from rotating with said back guard when the latter is turned to tighten or release said nut.

4. An edge trimmer comprising a cutter shaft having an abutment thereon, a toothed cutter sleeved on said shaft in engagement with said abutment on said cutter shaft, a shield on the outer face of said cutter, a threaded stud extending axially from said cutter shaft beyond the outer face of said shield, a nut threaded on said threaded stud for forcing the cutter shield against the outer face of said cutter and said cutter against said abutment, said nut having teeth adapted to engage said shield, and a back guard slidably and freely rotatably mounted on said cutter shaft and having teeth on its cutter opposing face adapted to interlock with the teeth of said cutter, whereby said nut is adapted to be tightened and released by rotating said back guard relative to said cutter shaft.

5. An edge trimmer comprising a cutter shaft, a toothed cutter sleeved thereon, a cutter shield positioned against the outer face of said cutter, a threaded stud extending axially from said cutter shaft beyond the outer face of said shield, a nut threaded on said threaded stud for forcing the cutter shield against the outer face of said cutter, the shield engaging portion of said nut being provided with teeth, a back guard slidably and freely rotatably mounted on said cutter shaft and having teeth on its cutter opposing face adapted to interlock with the teeth of said cutter, whereby said nut is adapted to be tightened and released by rotating said back guard on said shaft, a spring for yieldably holding said back guard in engagement with said cutter, means for adjusting said back guard relative to said cutter, said means comprising a screw mounted in said back guard and bearing against the adjacent end face of said cutter, a stop on said cutter shaft for limiting the outward sliding movement of said back guard, and a collar fixed to said cutter shaft for limiting the inward sliding movement of said back guard, said collar constituting means for holding said shaft from rotating while the back guard is being rotated to tighten and release said nut.

HARRY W. KRAG.